(12) United States Patent
Loutfy et al.

(10) Patent No.: US 6,511,766 B1
(45) Date of Patent: Jan. 28, 2003

(54) LOW COST MOLDED PLASTIC FUEL CELL SEPARATOR PLATE WITH CONDUCTIVE ELEMENTS

(75) Inventors: Raouf O. Loutfy, Tucson, AZ (US); Mathias Hecht, Tucson, AZ (US)

(73) Assignee: Materials and Electrochemical Research (MER) Corporation, Tucson, AZ (US)

(*) Notice: Subject to any disclaimer, the term of this patent is extended or adjusted under 35 U.S.C. 154(b) by 117 days.

(21) Appl. No.: 09/591,191

(22) Filed: Jun. 8, 2000

(51) Int. Cl.[7] .................. H01M 2/00; H01M 2/02; H01M 2/14; H01M 2/16; H01M 2/18

(52) U.S. Cl. .................. 429/34; 429/38; 429/143; 429/249

(58) Field of Search .................. 429/30, 34, 38, 429/143, 249

(56) References Cited

U.S. PATENT DOCUMENTS

| | | | | |
|---|---|---|---|---|
| 4,197,178 A | * | 4/1980 | Pellegri et al. | 204/255 |
| 4,214,969 A | * | 7/1980 | Lawrance | 204/255 |
| 4,225,654 A | * | 9/1980 | Tajima et al. | 429/34 |
| 4,339,322 A | * | 7/1982 | Balko et al. | 204/255 |
| 5,567,500 A | * | 10/1996 | Marshall et al. | 428/116 |

* cited by examiner

Primary Examiner—Patrick Ryan
Assistant Examiner—Julian Mercado
(74) Attorney, Agent, or Firm—Jerome M. Teplitz

(57) ABSTRACT

A bipolar or unipolar separator plate for an electrochemical fuel cell is formed of an insulating slab of plastic material such as a polymer matrix having a plurality of electrically conductive elements embedded therein for conducting electricity from an adjacent electrode of the cell to an electrical conductor on the opposite side of the slab for deriving electricity from the cell. The conducting elements are preferably formed of aligned carbon fiber composite cylinders and the insulating slab is formed of a plastic such as epoxy, polyamide, polystyrene, polyphenylene oxide or polyphenylene sulfide molded around the conductive elements.

23 Claims, 4 Drawing Sheets

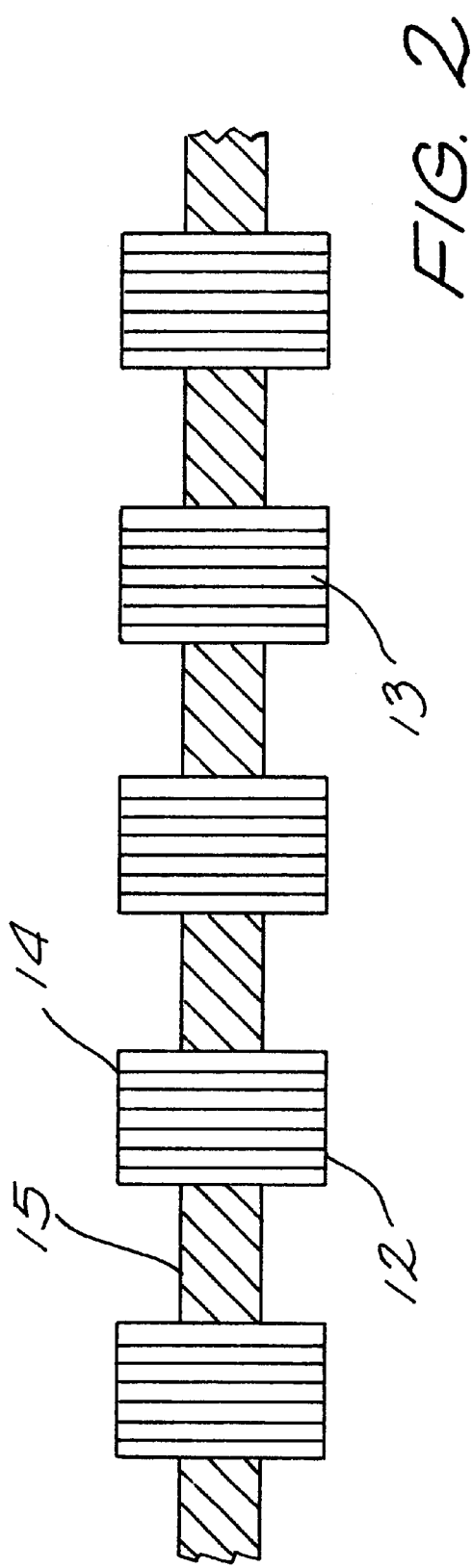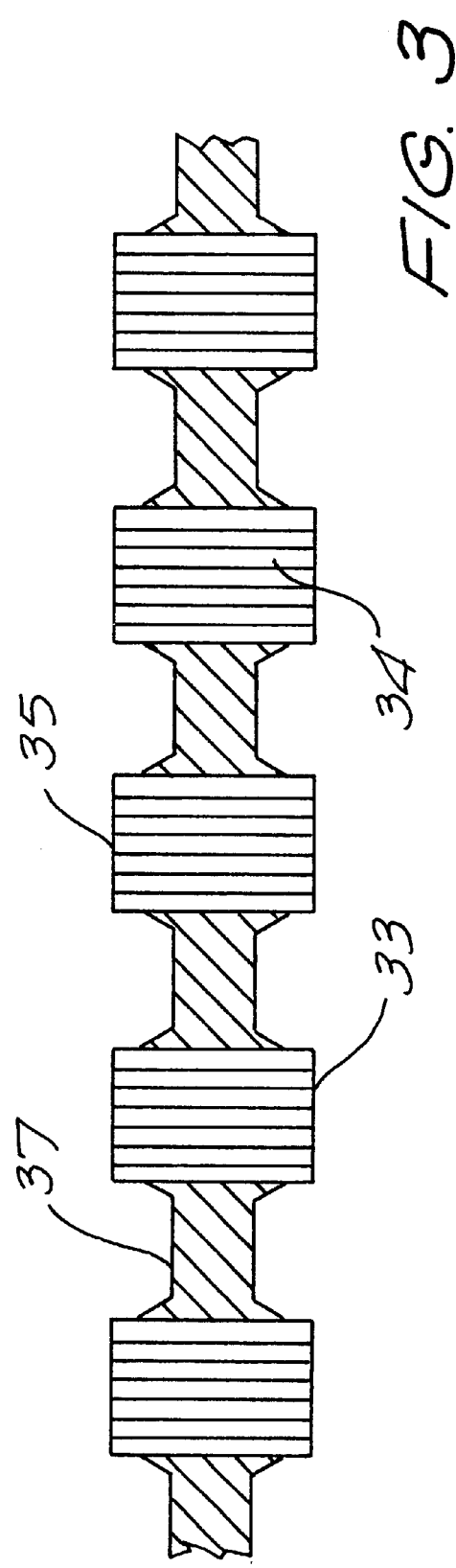

LOW COST MOLDED PLASTIC FUEL CELL SEPARATOR PLATE WITH CONDUCTIVE ELEMENTS

FIELD OF THE INVENTION

This invention relates to improved fuel cell assemblies, and, in particular, to bipolar and unipolar separators for fuel cell assemblies with solid polymer electrolyte positioned between electrodes of the cell.

BACKGROUND OF THE INVENTION

Fuel cells, which produce electricity from fuel containing hydrogen, methanol or ethanol and air or oxygen, have long been considered a viable alternative to power generation by combustion. Potential advantages of fuel cells include very low or zero emission, low noise and high efficiency. One of the most promising fuel cell technologies uses proton conductive membranes as electrolyte. It has been shown that such fuel cells have a great potential to supply electrical power for on-site generation in buildings, at remote locations, in portable power generators and in vehicles.

A typical fuel cell assembly, which uses proton conductive membranes, consists of stacked cell units. Each of the fuel cell units includes a membrane electrode assembly, which consists of a proton conductive membrane stacked between two electrodes. One electrode is the cathode (air and/or oxygen side) and one the anode (fuel side). At the cathode, the oxygen containing fluid reacts with the catalyst forming anions. The fuel reacts at the catalyst layer to form solvated hydrogen cations, which migrate through the membrane to the cathode. The cations react on the cathode with the anions to produce water, heat and electricity.

Membrane material can be a perfluorosulfonic ion exchange polymer sheet as sold by DuPont under its Nafion trade designation. The electrodes consist typically of porous carbon materials with catalyst layers containing platinum or platinum group metals as active components. Suitable membrane electrode assemblies can be obtained from several companies, such as W.L. Gore & Associates, Inc. of Elekton, Md., which sell them under the trade name PRIMEA Membrane Electrode Assemblies or from MER Corporation of Tucson, Ariz.

The membrane electrode assemblies are typically interposed between separator plates, which distribute fuel and oxidant to the respective sides of the membrane electrode assemblies, provide means for removing reaction products, serve as current collectors and structurally support the membrane electrode assemblies. The separator plates should be durable under typical fuel cell operating condition and should not interfere with the catalytic functions of the electrodes. In addition, they should prevent mixing of fuel and oxidant and seal at least the fuel to the outside atmosphere.

The plates are commonly referred to as bipolar separator plates if both fuel compatible (anode) and oxidant compatible (cathode) functions are combined in the same plate. Plates, which are designed to only provide fuel or only oxidant compatible functions, are commonly referred to as unipolar plates. Such plates can be used to terminate a stack of bipolar separator/membrane electrode assemblies units.

Multiple cell units are most commonly stacked up to increase the overall power in a fuel cell stack. In such an arrangement, fuel and/or oxidant manifolds can be incorporated in the stack. It is often advantageous to compress the fuel cell units together to improve contact of the electrode membrane assemblies to the separator plates, to facilitate fluid sealing and to achieve stable performance.

Fuel cells with solid electrolyte have not reached a significant market penetration, mainly because of high cost, which are due to the expensive materials used for the electrodes, membranes and separator plates and their costly production and assembly. Whereas the cost issues of the electrodes and the membranes are being addressed, the separator plates remain the most expensive component of a fuel cell.

Prior art separator plates use monolithic graphite, which is expensive because of high material costs and the difficulty to form flow field channels in the plates. In addition, these materials are brittle, which makes them prone to cracking and subsequent fuel cell failure. This tendency to crack is aggravated by the need to compress the fuel cell stack and by the temperature changes during operation.

Other prior art separator plates such as disclosed in U.S. Pat. Nos. 5,858,567, 5,863,671 and 5,683,828 describe the use of refractory metals and titanium as materials for the separator plates. These plates are expensive, difficult to form and corrosion products cause problems to the electrodes and membranes.

Further prior art separator plates such as disclosed in U.S. Pat. No. 5,773,161 use stainless steel and nickel plated stainless steel separator plates, which cause unacceptable corrosion when operated at temperatures where liquid water can be present.

U.S. Pat. No. 5,300,370 describes a separator plate formed from flexible graphite foil sheets. These sheets, however, have very poor mechanical properties and are gas permeable.

U.S. Pat. No. 4,214,969 teaches the use of molded aggregates of electrically conductive particles such as carbon and graphite in random polymer matrices. These composites have the drawbacks of relatively high electrical resistance, high surface resistance, low hardness and poor mechanical properties.

OBJECTS AND ADVANTAGES OF THE PRESENT INVENTION

It is an object of the present invention to provide improved separator plate structures that overcome one or more of the deficiencies of those of the prior art, particularly those deficiencies discussed above.

Accordingly, there is a strong need for low cost separator plates, which are easy to manufacture. It is, therefore, an objective of the present invention to provide a bipolar separator, which is significantly simpler to fabricate, and does not need machining or etching operations to form the flow field.

It is also an objective of the present invention to lower the cost of the separator plates by extensive use of plastic and by simplified manufacturing.

It is a further objective of the present invention to provide a bipolar plate separator, which has good mechanical properties and a long lifetime.

Advantages of this invention include the low cost of the separator plates due to the use of at least 70% plastic in the separator plates.

Advantages include also the simplicity of manufacturing of the preferred separator plates due to the feasibility to mold the plastic body around the conducting elements and to form the flow field without machining or etching operations.

SUMMARY OF THE INVENTION

The above and other objectives are realized in fuel cell separator plates constructed in accordance with the principles of the present invention. The invented separator plates are made of plastic, which is molded around a multitude of conductive elements.

In one embodiment, the plastic part of the plate comprises at least one outlet for the fuel, at least one inlet for fuel, at least one inlet for the air or oxygen, and at least one outlet for the air and/or oxygen.

In accordance with the present invention, there is provided a novel fuel cell for producing electricity by passing hydrogen and oxygen containing fluids over electrodes having an electrolyte body sandwiched between them; and more particularly here is provided a novel separator plate of insulating material and that is positioned adjacent to the electrode of the cell and having recessed surfaces portions forming channels therein for providing flow paths for the respective fluids passing over the electrodes and having a plurality of electrically conducting elements embedded therein, one end of each element being in electrical contact with the adjacent electrode and the other end of the element being in electrical contact with an electrical conductor for deriving electricity produced across the electrodes.

In a preferred embodiment, the conducting elements are made of aligned carbon fiber-polymer composite cylinders, with carbon fibers aligned perpendicular to the main surface of the bipolar plate. In the preferred embodiment, the body of the plate is molded from plastic formed around these conducting elements. In the preferred embodiment, the plastic can be filled or unfilled plastic such as polycarbonate, polyamide, polystyrene, polyphenylene oxide, epoxy, polyphenylene sulfide or the like. In the preferred embodiment, the conducting elements are made of in rod direction aligned carbon fiber/ plastic composites, where the plastic of the composite rods is preferably the same plastic material as used in the body of the plate. Preferred carbon fiber can be high electrically conductive fiber such as pitch based fiber.

BRIEF DESCRIPTION OF THE DRAWINGS

One way of carrying out the invention is described in more detail in the accompanying drawings, in which:

FIG. 2 shows a cross-section denoted 10 in FIG. 1, which illustrates a preferred placement of the conducing element trough the plates.

FIG. 3 shows a cross-section denoted 10 in FIG. 1, which illustrates a further preferred placement of the conducing elements trough the plastic plates.

DETAILED DESCRIPTION OF THE DRAWINGS

This detailed description illustrates the invention by way of example and not by way of limitation of the principles of the invention. It is intended to clarify for a person skilled in the art how to make use of the invention.

Figure 1:
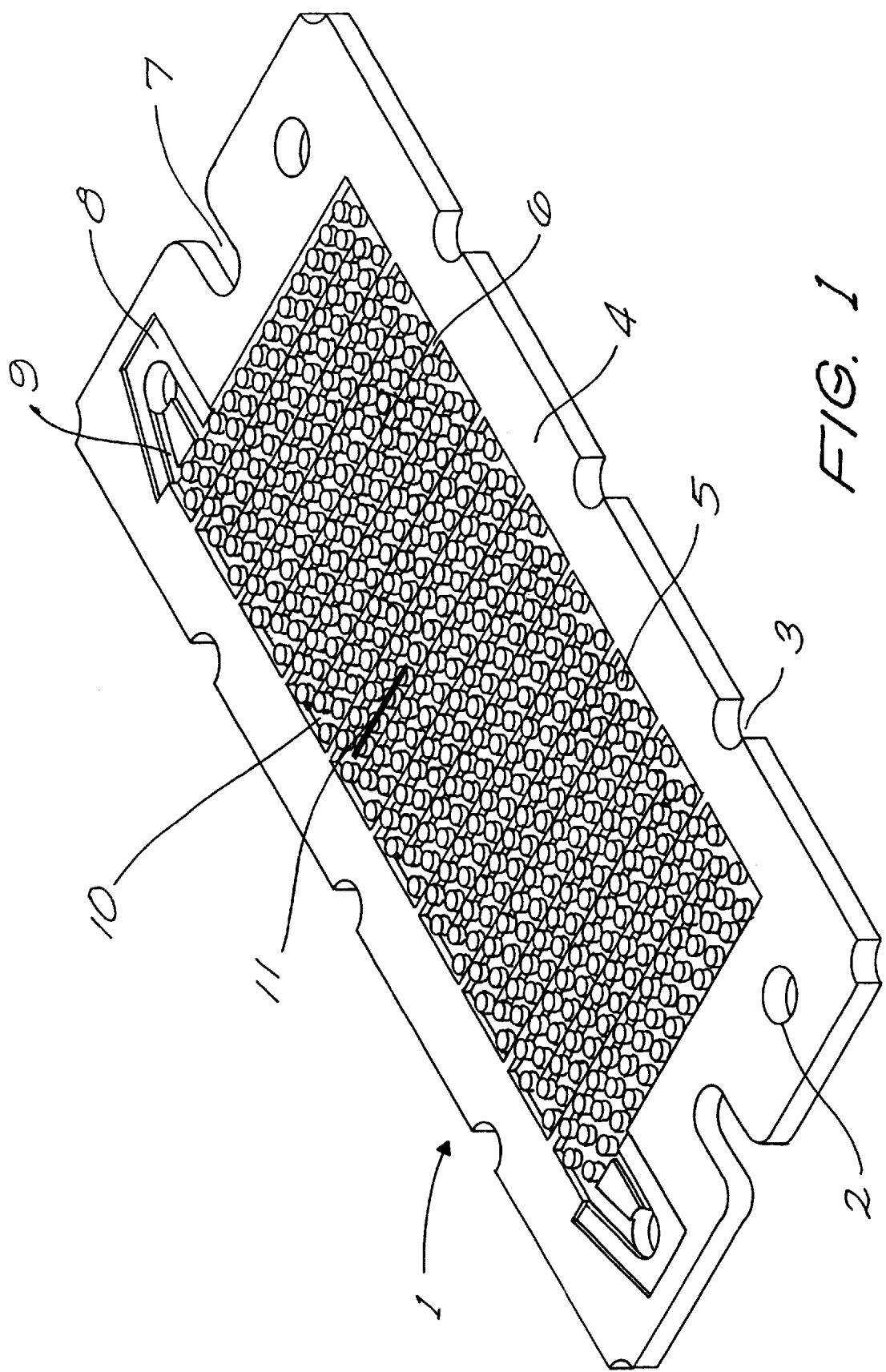
FIG. 1 shows an isometric view of a preferred bipolar separator plate with the conducting elements in the flow field and openings for bolts and fuel and oxidant feeds.

Turning first to FIG. 1, an isometric view of separator plate 1 shows, openings for fuel or oxidant 2, a multitude of openings 3 and 7 for tightening rods (not shown, for compressing the fuel cell stack together) an outer sealing surface 4, a multitude of conductive rods 5, plastic channel elements 6 which extend between some of the conducting elements, depressions for fluid-inlet cover sheets 8, channels to connect the flow field to the fuel or oxidant openings 9, a lowered center surface 10 and a line showing the location of a partial cross section 11. This side of the separator plate is compatible with fuel or oxidant. Typically, the conducting elements 5 can be formed from aligned carbon fiber/resin composite elements, whereby the carbon fiber is aligned perpendicular to the surface of the surrounding plate. Other materials for the conductors can include graphite rods or blocks and/or metal parts. Cylinders made of carbon fiber/ plastic composite are used in the preferred embodiment. The components of the carbon fiber/plastic composites in the preferred embodiment can include, but are not limited to, carbon fibers such as the products sold by Amoco of Alpharetta, Ga. under the trade name THORNEL. The resin in the preferred embodiment carbon fiber composite rod can include, but is not limited to, Epoxy such as the product sold by Shell Chemical Company of Houston, Tex. under the trade name EPON RESIN. The preferred embodiment of the conductors has a carbon fiber content of 50–95% with the rest being a polymer binder. The individual conducting cylinders of the preferred embodiment can be made by cutting such composite rods into sections of the appropriate length. The rods can be obtained from AVIA Sport Composite, INC. of Hickory, N.C. Typical diameters of the rods can be in the range 0.8 to 5 mm, preferably in the range 2–4 mm. Fuel and oxidant feed holes 2 designate inlet or outlet for fuel or oxidant. It should be understood that these openings are depicted as round holes solely for the purpose of illustration and can be of slotted, oval, rectangular, square or the like shape. It should also be understood that it is within scope of the present invention that more than four holes can be used. Fluid openings 9 adjacent to these holes are pointing towards the flow field and allow passage of fuel or oxidant and reaction products into or out of the flow field. The lowered center surface 10 in FIG. 1 provides an opening for fuel or oxidant fluid to interact with the membrane electrode assembly if assembled in a fuel cell. The depth of the lower center surface can be in the range 0.3 to 10 mm preferable in the range 0.5 to 1.5 mm. Openings 3 and 7 in the outside of the plate provide provisions for tie rods (not shown). These openings 3 and 7 are depicted as round only for the purpose of illustration and can be of slotted, oval, rectangular, square or the like shape. The openings can also be surrounded by the plate material.

Partial cross section 11 is taken from plate 1 of FIG. 1 and detailed in FIGS. 2 and 3 to illustrate the fiber alignment of the preferred embodiment further. FIG. 2 illustrates the plastic body of the plate 15 molded around conducting elements 14, which consist preferably of aligned carbon fibers 12 in a polymer matrix, which consists preferably of the same polymer 13 used in the body of the plate 15. In the preferred embodiment, the carbon fiber of the elements 14 is aligned perpendicular to the mean plate surface going through the full length of the elements. This alignment corresponds to the electrical current flow direction in an assembled fuel cell. The plastic body of the bipolar plates 15 can be molded around the conducting elements by compression molding, injection molding or the like.

FIG. 3 illustrates another preferred embodiment of partial cross section 11 of FIG. 1. Plastic 37 is molded around the conducting elements 35, forming the separator plate. The conducting elements consist preferably of aligned carbon fibers 33 in a polymer matrix 34, which consists preferably of the same polymer used in the body of the plate 37. In this preferred embodiment, the carbon fiber is aligned perpendicular to the mean plate surface going through the full length of the elements 35. This alignment corresponds to the electrical current flow direction in an assembled fuel cell. The plastic body of the bipolar plates can be molded around the conducting elements by compression molding, injection molding or the like.

Figure 4:
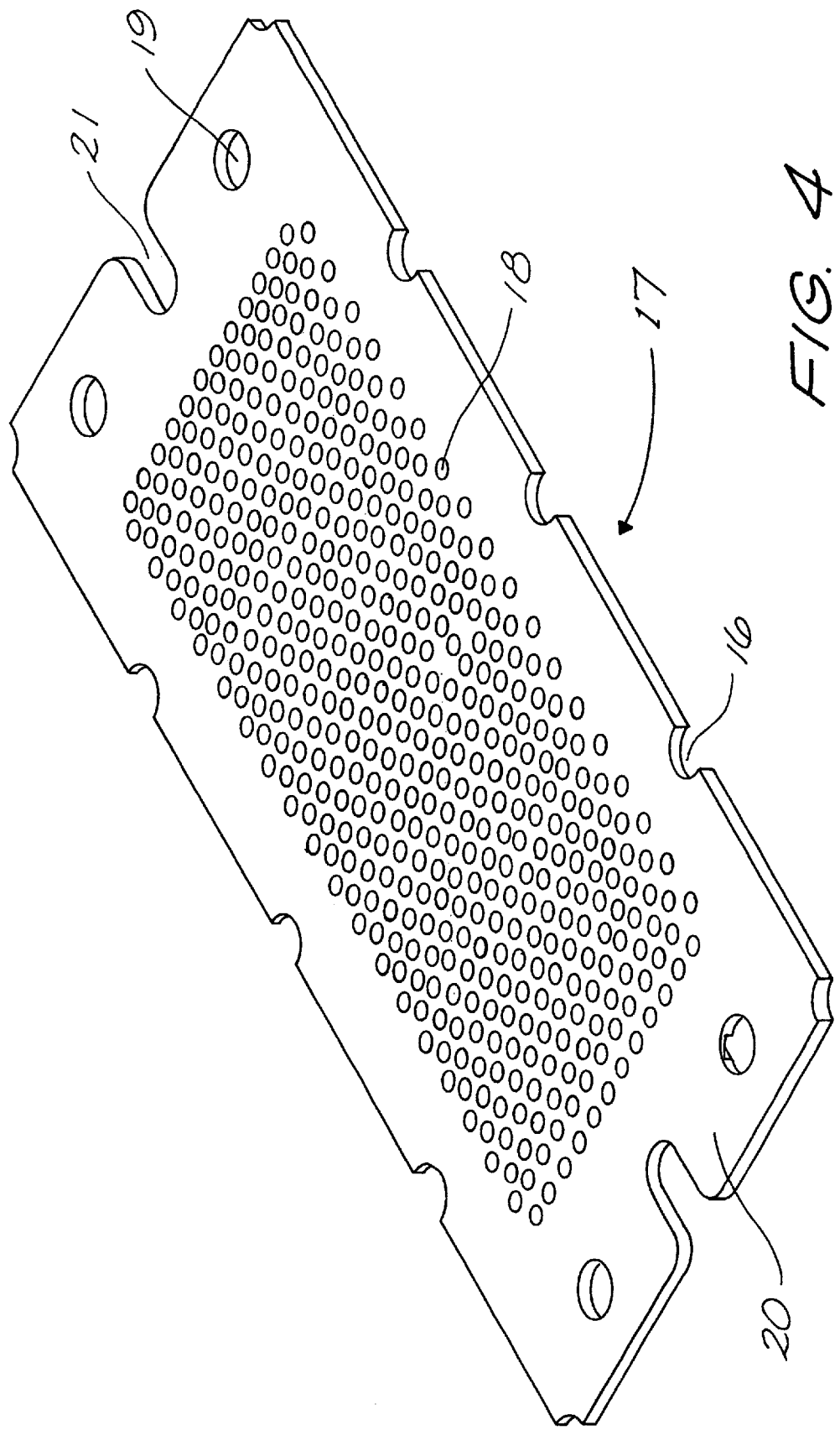
FIG. 4 shows the flat side of a preferred unipolar plate, which can be used to terminate a fuel cell stack towards end plates and/or cooling plates.

FIG. 4 is an isometric view of the flat side of a unipolar separator plate 17. This Figure shows the plastic body of the plate 17 with a number of openings 16 and 21 for tie rods (not shown), four fluid feed through openings 19 and a multitude of conducting elements 18, which form a common geometric surface. A conducting plate (not shown) such as a metal plate can be pressed against this surface to collect the current of the fuel cell or to conduct heat. The backside of plate 20 can be substantially identical to either side of the bipolar plate shown in FIG. 1. The openings 16 and 21 are for tie rods (not shown) and these openings 16 and 21 are shown with round shape only for the purpose as an example. These openings 16 and 21 can also be holes, square shaped holes and the like. The four openings 19 provide connections for fuel in and outlet and for reaction products. Fuel in- and outlet of the fuel cell can be connected to these holes 16 and 21. It should be understood that these openings 16 and 21 are depicted as round holes solely for the purpose of illustration and can be of slotted, oval, rectangular square or the like shape. It should also be understood that it is within scope of the present invention that more than four holes can be used. The ends of the conducting elements 18 extend trough the plate 20. A conducting plate (not shown) such as a metal plate can be pressed against the surface 17 to collect the current of the fuel cell or to conduct heat.

Figure 5:
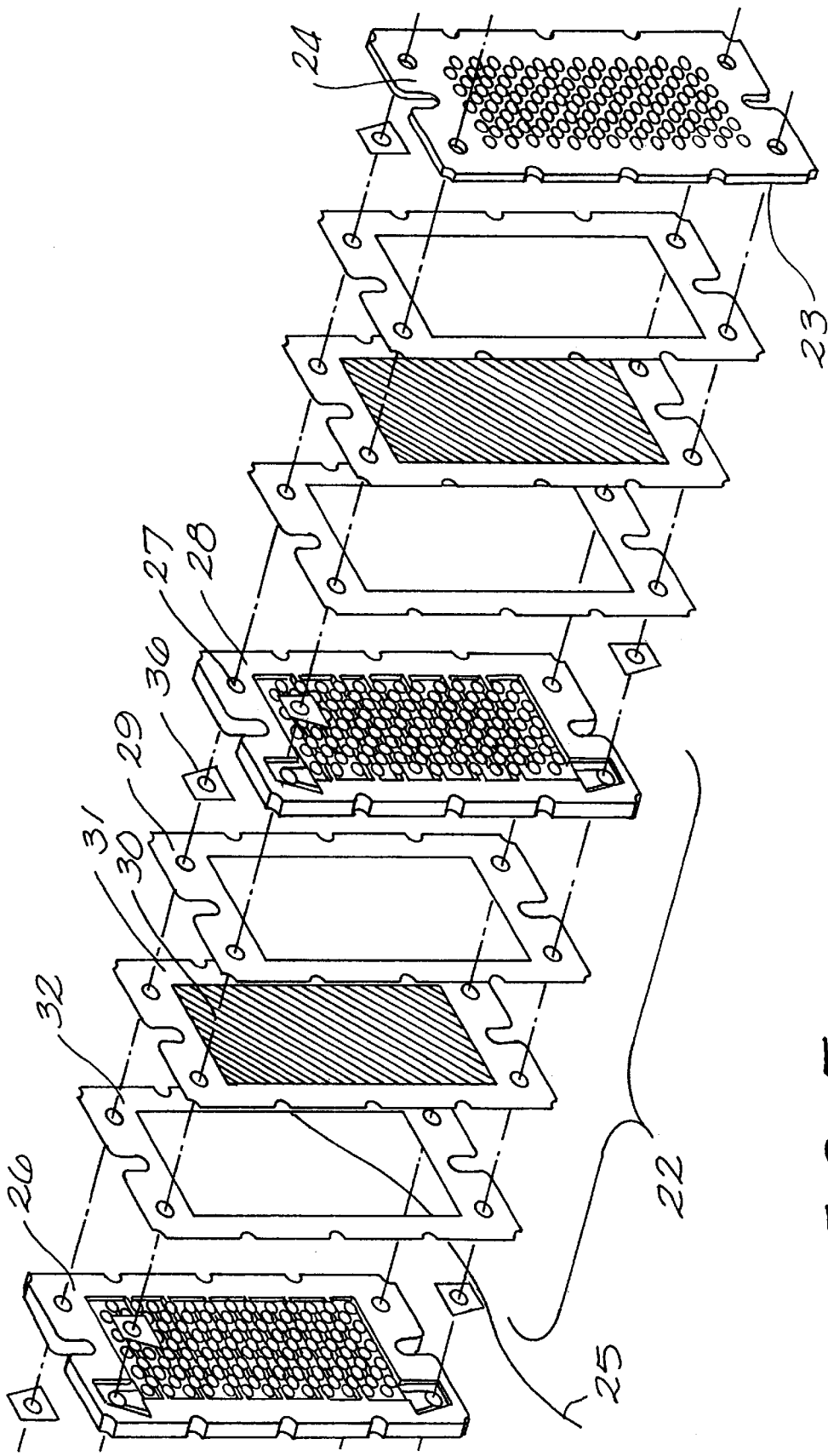
FIG. 5 illustrates an assembly of preferred separator plates into a fuel cell stack together with membrane electrode assemblies, support sheets and gaskets.

Turning to FIG. 5, an example of a possible arrangement of the preferred separator plates with other components to form a part of a fuel cell stack assembly is shown. While this example shows a possible arrangement of the particular embodiments, it should be understood that the invention is not limited thereto since other arrangements of the components shown in FIG. 5 can be made by those skilled in the art.

Section 22 in FIG. 5 shows a cell unit, which can be repeated throughout the fuel cell. Additional units are exemplified starting as 26 behind line 25. The unit 22 consists of at least one bipolar separator plate 28 of the preferred embodiment, two gaskets 29 and 32, four support sheets 36 and a membrane electrode assembly consisting of a membrane 31 and two electrodes 30. Gaskets, support sheets and membrane electrode assembly can be obtained commercially and can be easily fit in the cell by those skilled in the art. The four openings 27 are for fuel feed and oxidant inlet and outlet. The fuel cell unit 22 can be repeated throughout the stack to increase the power output of the stack. However, unit 22 can be omitted forming effectively a one-cell fuel cell, terminated with two unipolar plates 24 on the ends.

The uni-polar separator plate 24 in FIG. 4 terminates the fuel cell stack towards one end plate or a cooling plate. For the purpose of example the side of this plate, could be in contact with a metal plate to collect the current produced by the fuel cell. The back side 23 of plate 24 can be substantially identical to either side of the bipolar separator plate 28.

The foregoing description of the invention has been presented for the purpose of illustration and is not intended to be exhaustive or limiting to the invention. Modifications can be made by those skilled in the art in the light of the above teachings falling within the scope to best utilize the invention in a variety of particular embodiments. It is intended that the scope of the invention be defined by the claims append hereto.

What is claimed is:

1. A fuel cell for producing electricity from fluid fuel comprised at least in part of hydrogen and an oxidizing fluid comprised at least in part of oxygen, said cell comprising first and second electronically separate electrodes, each of which is comprised of a porous material and an electrolyte body in electrochemical contact with both of said electrodes, and means for deriving electricity produced across the electrodes of said cell, a first conduit defining a first closed flow path adjacent to a surface of the first electrode that is remote from the electrolyte body for distributing the fluid fuel over said electrode and for removing reaction products produced on the first electrode and occurring in said first flow path, a second conduit defining a second closed flow path adjacent to a surface of the second electrode that is remote from the electrolyte body for distributing the oxidizing fluid over said electrode and for removing reaction products produced on the second electrode and occurring in said second flow path, said first and second flow paths being isolated from one another so as to prevent the fluid fuel and said oxidizing fluid from coming in contact with one another, at least said fluid fuel flow path being isolated from ambient atmosphere to prevent oxidation of said fluid fuel thereby, said electrolyte comprising a proton conductive membrane sandwiched between said first and second electrodes, thereby forming an electrode membrane assembly, first and second separator plates each having a main surface, respectively positioned adjacent to and in contact with the first and second electrodes of the electrode membrane assembly, each of said separator plates comprising a slab of electrically insulating material having recessed surface portions forming channels, which together with the respective adjacent electrode form walls of the conduits defining the respective first and second flow paths, each of said conduits having an inlet for receiving the respective fluid for distribution over the respective electrode as it flows over the respective flow path defined by the recessed surface portions forming the channels of the respective slab comprising the separator plate and having a respective outlet at the end of its flow path for removing fluid including reaction products produced on the respective electrode and occurring in the flow path and any fluids introduced in the flow path that are unaltered, each of said separator plates having a plurality of electrically conducting elements embedded therein, said electrically conducting elements being comprised of carbon fiber and plastic composites with the carbon fibers aligned perpendicular to the plane of the main surfaces of the respective separator plate and going through the full length of said electrically conducting elements, one end of each of said conducting elements being in electrical contact with the respective adjacent electrode of said electrode membrane assembly and the other end of each of said elements being electrically accessible to the opposite side of said plate, said means for deriving electricity produced across said electrodes comprising first and second electrical conducting means in contact with the respective other ends of the conducting elements on the respective side of the separator plates remote from the respective electrode.

2. A fuel cell as defined in claim 1, wherein the slabs comprising said separator plates are formed of plastic material and the electrically conductive elements are molded therein.

3. A fuel cell as defined in claim 2, wherein the plastic component of said conductive elements is a polymer matrix and wherein the slabs comprising said separator plates are formed essentially of the same polymer matrix.

4. A fuel cell as defined in claim 1, wherein the fluid fuel and oxidizing fluid are essentially in gaseous form.

5. A fuel cell as defined in claim 4, wherein the electrodes are comprised of a porous gas diffusion layer and a catalyst.

6. A fuel cell as defined in claim 1, wherein the means for deriving electricity across the electrodes of said cell comprises an electrically conductive collector plate adjacent to the side of at least one of said separator plates remote from the respective electrode, for deriving the electricity from said other ends of the conducting elements.

7. A fuel cell as defined in claim 6, wherein the separator plate adjacent to the collector plate is an end separator plate of the cell and the recessed surface portions forming a flow path on the end separator plate of the cell are formed on only one side of the slab comprising said plate and the opposite side of said slab is substantially flat, thereby forming a unipolar separator plate for the cell.

8. A multi cell fuel cell comprised of a plurality of fuel cells as defined in claim 1, wherein adjacent cells thereof are electrically coupled to one another through a common separator plate of the bipolar type, the respective sides of which are positioned adjacent the respective electrolyte bodies of adjacent cells of the multi cell fuel cell.

9. A fuel cell as defined in claim 1, wherein the channels formed by the recessed surface portions of the respective slabs are configured as a plurality of parallel channels, each of which is joined to the next such parallel channel at the end thereof that is opposite to the previous such parallel channel in the flow path.

10. A fuel cell as defined in claim 1, wherein the channels forming the conduit defining the flow path of the separator plate are formed at least in part by plastic ribs extending between the conducting elements.

11. A separator plate suitable for use as a component of a fuel cell for deriving electricity from fluid fuel comprised at least in part of hydrogen and an oxidizing fluid, wherein the fuel cell includes respective channels forming closed flow paths for passing the fluid fuel and oxidizing fluid over the respective surfaces of first and second electronically separate electrodes, both of which are in electrochemical contact with an electrolyte body sandwiched between the electrodes thereby forming an electrode assembly, said separator plate comprising a slab of electrically insulating material having recessed surface portions forming channels which together with the surface of a respective adjacent electrode is adapted to form walls of a conduit defining the flow path across the surface of said adjacent electrode, and wherein said separator plate has a main surface and a plurality of electrically conducting elements embedded therein, said electrically conducting elements being comprised of carbon fiber and plastic composites with the carbon fibers aligned perpendicular to the plane of the main surface of the separator plate and going through the full length of said electrically conducting elements, one end of each of said conducting elements being adapted to be in electrical contact with the respective adjacent electrode of an electrode assembly and the other end of each said elements being electrically accessible to the opposite side of the slab comprising said separator plate, whereby said other end of said elements are adapted to be contacted by means for deriving electricity from the fuel cell.

12. A separator plate as defined in claim 11, wherein the slab comprising said separator plate is formed of plastic material and the conductive elements are molded therein.

13. A separator plate as defined in claim 12, wherein the plastic component of said conductive elements is a polymer matrix and wherein the slab comprising said separator plate is formed essentially of the same polymer matrix.

14. A separator plate as defined in claim 13 that is formed as a product of injection molding.

15. A separator plate as defined in claim 13 that is formed as a product of compression molding.

16. A separator plate as defined in claim 12 that is formed as the product of injection molding.

17. A separator plate as defined in claim 12 that is formed as a product of compression molding.

18. A separator plate as defined in claim 11, wherein both main surfaces of the insulating slab comprising said plate are provided with recessed surface portions forming channels, whereby the respective channels of said separator plate are adapted to form the walls of conduits defining the respective flow paths across the adjacent surface of an electrode assembly on each side of said plate, whereby said separator plate is adapted to serve as a bipolar separator plate between adjacent cells of a multi-cell fuel cell.

19. A separator plate as defined in claim 11, wherein insulating plastic material is molded between the conducting elements and into the body of the plate and is selected from among filled or unfilled epoxy, polyamide, polystyrene, polyphenylene oxide, polyphenylene sulfide or mixtures or blends thereof.

20. A separator plate as defined in claim 11, wherein the recessed surface portions of the slab that forms the channels are configured as a plurality of parallel channels each of which is joined to the next such parallel channel at the end thereof that is opposite to the previous such parallel channel in the flow path.

21. A separator plate as defined in claim 11, wherein the channels forming the conduit defining the flow path are formed at least in part by plastic sides extending between the conducting elements.

22. A separator plate as defined in claim 11, wherein recessed surface portions forming a flow path are formed on only one side of the slab comprising said plate and the opposite side of said slab is substantially flat, thereby forming a unipolar separator plate.

23. A separator plate as defined in claim 11, wherein the recessed surface portions forming a flow path are formed on both sides of the slab comprising said plate, thereby forming a bipolar separator plate.

* * * * *